(12) United States Patent
Coing et al.

(10) Patent No.: US 9,616,608 B2
(45) Date of Patent: Apr. 11, 2017

(54) PROCESS FOR FASTENING AN ACCESSORY IN A BLOW MOLDED PLASTIC TANK

(71) Applicant: Inergy Automotive Systems Research (Societe Anonyme), Brussels (BE)

(72) Inventors: Jean-Francois Coing, Clairoix (FR); Pierre Lacome, Lachelle (FR)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 0 days.

(21) Appl. No.: 14/716,113

(22) Filed: May 19, 2015

(65) Prior Publication Data
US 2015/0336322 A1 Nov. 26, 2015

(30) Foreign Application Priority Data

May 23, 2014 (EP) .................................... 14169732

(51) Int. Cl.
*B29C 49/48* (2006.01)
*B29C 49/20* (2006.01)
(Continued)

(52) U.S. Cl.
CPC .......... *B29C 49/4815* (2013.01); *B29C 49/20* (2013.01); *B29C 49/4802* (2013.01);
(Continued)

(58) Field of Classification Search
CPC ........ B29C 2049/4812; B29C 49/4815; B29C 49/4817; B29C 2049/4807; B29C 2049/2034
(Continued)

(56) References Cited

U.S. PATENT DOCUMENTS

| 5,445,783 A | 8/1995 | Irish et al. |
| 2010/0126659 A1* | 5/2010 | Roos ...................... B29C 49/20 156/245 |
| 2011/0035928 A1* | 2/2011 | Mbog .................. B60K 15/077 29/428 |

(Continued)

FOREIGN PATENT DOCUMENTS

DE 10 2006 006 469 A1 8/2007
EP 0 103 832 A2 3/1984

OTHER PUBLICATIONS

European Search Report issued Oct. 9, 2014 in European Application 14169732, filed on May 23, 2014.

*Primary Examiner* — Alison L Hindenlang
*Assistant Examiner* — Mohamed K Ahmed Ali
(74) *Attorney, Agent, or Firm* — Oblon, McClelland, Maier & Neustadt, L.L.P.

(57) ABSTRACT

It is proposed a process for fastening an accessory to the interior of a blow-molded tank, the tank having a plastic wall produced from a parison, the accessory comprising a body having at least one attaching portion projecting radially from the body. The process comprises the steps of:
  a) introducing the accessory and the parison in a molten state into a mold so that the accessory is surrounded by the parison, the mold comprising cavities, at least one cavity being equipped with at least one movable insert configured to fold locally some of the molten parison on the attaching portion;
  b) contacting the parison with the attaching portion;
  c) moving forward the insert and folding locally some of the molten parison on the attaching portion;
  d) closing the mold by moving the mold cavities to a final closing position and inflating the parison to form the blow-molded tank;
  e) moving backwards the insert; and
  f) opening the mold.

12 Claims, 12 Drawing Sheets

(51) Int. Cl.
  *B29K 101/12* (2006.01)
  *B29K 105/00* (2006.01)
  *B29L 31/00* (2006.01)
  *B29K 23/00* (2006.01)
  *B29C 49/04* (2006.01)
  *B29C 49/22* (2006.01)
  *B29C 49/42* (2006.01)

(52) U.S. Cl.
  CPC .............. *B29C 49/04* (2013.01); *B29C 49/22* (2013.01); *B29C 49/4273* (2013.01); *B29C 49/4817* (2013.01); *B29C 49/4823* (2013.01); *B29C 2049/2008* (2013.01); *B29C 2049/2078* (2013.01); *B29C 2049/4807* (2013.01); *B29K 2023/065* (2013.01); *B29K 2023/086* (2013.01); *B29K 2101/12* (2013.01); *B29K 2105/258* (2013.01); *B29K 2995/0067* (2013.01); *B29K 2995/0069* (2013.01); *B29L 2031/7172* (2013.01)

(58) Field of Classification Search
  USPC ........ 425/411, 414, 418; 264/512, 514, 520, 264/531
  See application file for complete search history.

(56) References Cited

U.S. PATENT DOCUMENTS

| | | |
|---|---|---|
| 2011/0174946 A1 | 7/2011 | Araya et al. |
| 2012/0056356 A1* | 3/2012 | Hall ........................ B29C 49/04 264/533 |
| 2012/0227237 A1 | 9/2012 | Tabuchi |

* cited by examiner

PROCESS FOR FASTENING AN ACCESSORY IN A BLOW MOLDED PLASTIC TANK

The present invention relates to a method for fastening an accessory to the interior of a blow molded tank. More specifically, the invention relates to a mechanical attachment between a fuel system accessory and the interior surface of a plastic fuel tank for a vehicle.

Various methods exist for attaching accessories to the interior of plastic fuel tanks during the blow molding process. Common fastening methods include welding and snap-riveting. It is also known dove-tailing techniques. One example is illustrated in U.S. Pat. No. 5,445,783 which teaches mechanically attaching an accessory to the interior surface of a fuel tank by an interlocking dove-tail fit. This process requires dove-tail grooves on the attaching surface of the accessory. This complicates the design of the accessory. Further, in the case of a multilayer fuel tank having a barrier layer to liquids and/or gases, this process can damage the continuity of the barrier layer and accordingly increase the risk of leakage.

In view of the above, there is a need for an improved method that allows an accessory to be fastened inside a fuel tank without damaging the imperviousness of the fuel tank, and which eliminates the need for a complex interlocking interface (i.e. dove-tail grooves) on the accessory.

An object of the present invention is to solve these above-mentioned problems by proposing a process for fastening an accessory to the interior of a blow-molded tank, said tank having a plastic wall produced from a parison, the accessory comprising a body having at least one attaching portion projecting radially from said body. The process comprises the steps of:

a) introducing the accessory and the parison in a molten state into a mould so that the accessory is surrounded by the parison, said mould comprising cavities, at least one cavity being equipped with at least one movable insert configured to fold locally some of the molten parison on said attaching portion;

b) contacting the parison with said attaching portion;

c) moving forward the insert and folding locally some of the molten parison on said attaching portion;

d) closing the mould by moving the mould cavities to a final closing position and inflating the parison to form said blow-molded tank;

e) moving backwards the insert; and f) opening the mould.

Thus, the accessory is secured to the interior of the tank by means of a mechanical attachment. This mechanical attachment is formed during the time of manufacture of the tank. In other words, the mechanical attachment is formed during the molding of the molten plastic parison.

Movable insert(s) is(are) used to form the mechanical attachment. Each movable insert is actuated to fold some of the molten parison on an attaching portion of the accessory such that the attaching portion is partially or totally overmolded (i.e. surrounded) by molten parison. Such overmolding permits a secure and permanent attachment of the accessory to the interior surface of the tank. Advantageously, the folded molten parison remains attached to the rest of the molten parison. The tank wall remains integral and impermeable. The insert(s) can move by translation or rotation or some combination of both. Advantageously, the movement of each insert and the pressure that it exerts on the parison at the location of its attachment to the accessory are controllable. In a particular embodiment, the movement of the insert(s) can be controlled by a hydraulic system. In another particular embodiment, the movement of the insert(s) can be controlled by a pneumatic system. In yet another particular embodiment, the movement of the insert(s) can be controlled by electrical actuator(s).

The attaching portion(s) of the accessory is(are) arranged so as to protrude radially from the body of the accessory. In a particular embodiment, the attaching portion(s) are extending substantially perpendicularly (or with a slight angle) out from the body of the accessory. The attaching portion(s) can have any shape as long as it has a free end onto which molten parison can be folded. In a particular embodiment, the accessory can comprise one or several fins or ribs (i.e. attaching portion) projecting radially from the body of the accessory. In a particular embodiment, the attaching portion(s) of the accessory can be integral with the body of the accessory (i.e. the body and the attaching portion(s) form a single piece). In another particular embodiment, the attaching portion(s) of the accessory can be fastened to the body of the accessory by any suitable fastening means. Examples of these means are clipping, screw-fastening, welding, etc. In a particular embodiment, the attaching portion(s) is(are) made of plastic. Preferably, the attaching portion(s) is(are) based on the same plastic as that forming the parison (and therefore the tank which is moulded from it).

The term "parison" is understood to mean a preform of a single part, generally extruded and generally of substantially tubular shape, which is intended to form the wall of the tank after moulding, i.e. after an operation which consists in forming the parison, which is in the molten state (i.e. melt state), into the required shapes and dimensions using the mould in order to obtain a tank. The process according to the invention preferably uses an extruded parison.

At step a) of the process according to the invention, the parison and the accessory are placed (i.e. introduced) in a mould, the accessory being surrounded by the (preferably stretched) parison. Generally, this takes place either by inserting the accessory into the parison that is held apart by an appropriate device, or by extruding the parison around the accessory while separating it with a device that follows its movement on exiting the extruder. Whichever variant is used, the process according to the invention therefore preferably uses a tool that makes it possible to stretch the parison (keep it open). This tool may consist of clamps or jaws capable of gripping the edges of the parison and keeping them apart.

In a particular embodiment, the accessory can be preheated prior to its placement in the parison, said preheating taking place preferably at least in the zones intended for its attachment to the parison.

In the process according to the invention, the accessory is preferably loaded onto a support prior to its placement in the parison. Generally, this loading is automated (carried out by a robot or a carousel-type device). In a particular embodiment, this support can be a type of rod. In another particular embodiment, this support can be a blow pin which may be used to introduce a pressurized gas (preferably air) into the parison at least during a pre-blow-moulding step. Preferably, this support for the accessory does not carry out another role so that it can be withdrawn before closure of the mould for the final blow moulding of the tank.

Advantageously, before step b) of the process according to the invention, the parison is simply pre-blow moulded/ inflated, preferably without contacting the mould cavities. The pre-blow moulding of the parison consists therefore of an expansion of said parison so that its "active" part (that clamped between the mould cavities and intended to form the tank after blow moulding) acquires substantially the same size (internal volume) as the tank, the final blow-moulding step (d) mainly serving to give it its final relief/shape.

In a particular embodiment, the support for the accessory is slidably mounted into an inner block. Before starting the pre-blow-moulding of the parison, two pinch plates (i.e. outer moving plates) move forward so as to clamp a portion of the lower end of the parison onto the inner block. Accordingly, this portion is sealed in a leaktight manner but without being welded. During the pre-blow-moulding of the parison, the two pinch plates are maintained at this closed position. The two pinch plates move back to an open position when the mould opens (step f)).

At step e) of the process according to the invention, each insert is retracted (i.e. moved back to its original position) such that it disengages the portion of folded parison. At step f) of the process according to the invention, the mould is opened and the tank is removed from the mould. Before opening the mould, the moulded parison is preferably left to cool—generally by circulating a cooling gas through one or more blow-moulding needles. The mould cavities are then preferably also cooled by circulation of a fluid in a network of ducts.

The mould comprises cavities, i.e. sorts of hollow half-shells, the perimeters of which are identical and the internal surface of which is equipped with a relief that corresponds to the external shape of the tank, the tank being moulded by pressing the parison against this surface using a pressurized gas injected into the parison, for example by means of a blow pin.

The tank according to the invention is made with a plastic wall.

The term "plastic" is understood to mean any material comprising at least one synthetic polymer resin.

Any type of plastic may be suitable. Particularly suitable plastics belong to the category of thermoplastics.

The term "thermoplastic" is understood to mean any thermoplastic polymer, including thermoplastic elastomers, and also blends thereof. The term "polymer" is understood to mean both homopolymers and copolymers (especially binary or ternary copolymers). Examples of such copolymers are, non-limitingly: random copolymers, linear block copolymers, other block copolymers and graft copolymers.

Any type of thermoplastic polymer or copolymer, the melting point of which is below the decomposition temperature, is suitable. Synthetic thermoplastics having a melting range spread over at least 10 degrees Celsius are particularly suitable. Examples of such materials include those that exhibit polydispersion in their molecular weight.

In particular, it is possible to use polyolefins, thermoplastic polyesters, polyketones, polyamides and copolymers thereof. A blend of polymers or copolymers may also be used similarly it is also possible to use a blend of polymeric materials with inorganic, organic and/or natural fillers such as, for example, but non-limitingly: carbon, salts and other inorganic derivatives, natural or polymeric fibres. It is also possible to use multilayer structures composed of stacked and joined layers comprising at least one of the polymers or copolymers described above.

One polymer that is often used is polyethylene. Excellent results have been obtained with high-density polyethylene (HDPE).

In a particular embodiment, the tank is a fuel tank. Preferably, such fuel tank has a multilayer structure comprising at least one thermoplastic layer and at least one additional layer which, advantageously, may be formed from a material that is a barrier to liquids and/or gases. Preferably, the nature and the thickness of the barrier layer are chosen so as to minimize the permeability of the liquids and gases in contact with the wall of the tank. Preferably, this layer is based on a barrier material, i.e. a fuel-impermeable resin such as, for example, EVOH (a partially hydrolysed ethylene/vinyl acetate copolymer). Alternatively, the tank may be subjected to a surface treatment (fluorination or sulphonation) for the purpose of making it impermeable to the fuel.

The term "accessory" is understood within the context of the invention to mean a component or a set of components (or a module) having an active role (i.e. performing a useful function) in the tank such as to ventilate, to store liquid, to convey liquid, to measure the liquid level, to reduce the noise linked to waves, etc. In a particular embodiment, the accessory is a swirl pot. The active role of a swirl pot is to constitute a fuel reserve (i.e. pump positive reserve) for the cases where the vehicle negotiates a turn, drives on a slope, etc. One advantage of the process according to the invention is that it makes it possible to provide a tank with a large capacity swirl pot. The swirl pot is secured to the interior of the tank by preforming folding operation such as described previously.

In an advantageous embodiment, the accessory comprises a pair of diametrically opposed attaching portions and the cavity is equipped with two movable inserts, each being configured to fold locally some of the molten parison on one attaching portion of said pair of diametrically opposed attaching portions. Accordingly, the accessory is permanently attached to the tank in a balanced manner (i.e. to ensure that stress concentrations during operation are avoided). In an advantageous embodiment, the two movable inserts are sized and shaped so as to form an attachment of the dovetail shape. In this latter embodiment, the attaching portions of the accessory are welded within the dovetail.

In a particular embodiment, each insert has a curved contact surface (which can fit around the attaching portion). Accordingly, the folding operation is simple. In a particular embodiment, each insert has a hook-shaped cross section.

In an advantageous embodiment, the cavity is equipped with a movable mounting structure on which the insert(s) is(are) movably mounted. In a particular embodiment, the movement of the mounting structure can be controlled by a hydraulic system.

Advantageously, the movement of the mounting structure is synchronised to the closing movement of the mould such that during steps b) and c) the mounting structure projects outwardly from said cavity and during step d) the mounting structure does not move so that it is retracted inside said cavity.

During step b) of the process according to the invention, the mould cavities are moved to an intermediate closing position at which the mounting structure presses the parison against said attaching portion. In this intermediate closing position, the mould cavities are not pressed against one another. During step c) the mould cavities are maintained in said intermediate closing position. At step d) of the process according to the invention, the mould is closed, i.e. the mould cavities are pressed against one another and clamp the parison between their perimeters (which delimits a parting line around the perimeter of the tank).

According to an aspect of the present invention, there is provided a mould for use in a process as described above.

The present invention is illustrated in a non limitative way by the examples below relying on FIGS. 1 to 12 attached.

These figures illustrate common components, namely:
1: a mould comprising two cavities (1a; 1b);
2: a parison;
3: a mounting structure;
4a: a first movable insert;
4b: a second movable insert;
5: a first hydraulic system;
6: a second hydraulic system;
7: a swirl pot;
8: a holding rod;
9: an inner block;
10: two pinch plates; and
11: a E-ring.

FIGS. 1 to 10 illustrate schematically the principle of a process according to a particular embodiment of the present invention.

Figure 1:
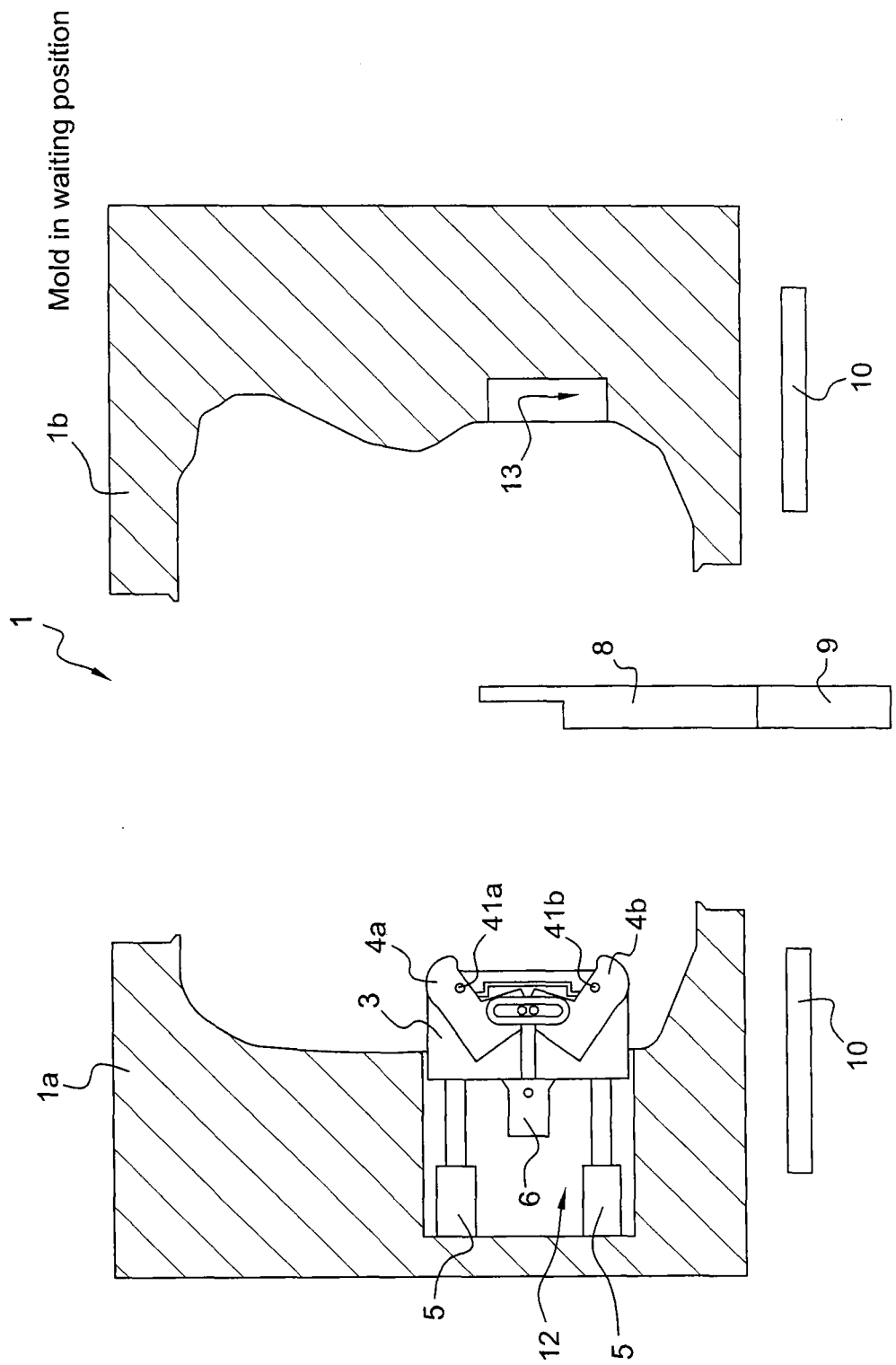
FIG. 1 is a cross-section view showing an embodiment including a mould in an open position (i.e. waiting position)

In FIG. 1, it can be seen the mould (1) in an open position (i.e. waiting position). The mould cavities (1a, 1b) have an internal surface that corresponds to the external surface of the tank to be moulded. The mould cavity (1a) comprises a recess (12) within which the mounting structure (3) and the hydraulic systems (5, 6) are positioned. In another particular embodiment, the hydraulic systems (5, 6) can be replaced by pneumatic or electrical actuator systems.

The mounting structure (3) is able to move in translation along one axis (not represented). The mounting structure (3) can move in and out of the recess (12). The movable inserts (4a, 4b) are movably mounted on the mounting structure (3). The movable inserts (4a, 4b) are able to move in rotation about the axis (41a, 41b). The pinch plates (10) are in an open position. The mould cavity (1b) comprises a recess (13).

Figure 2:
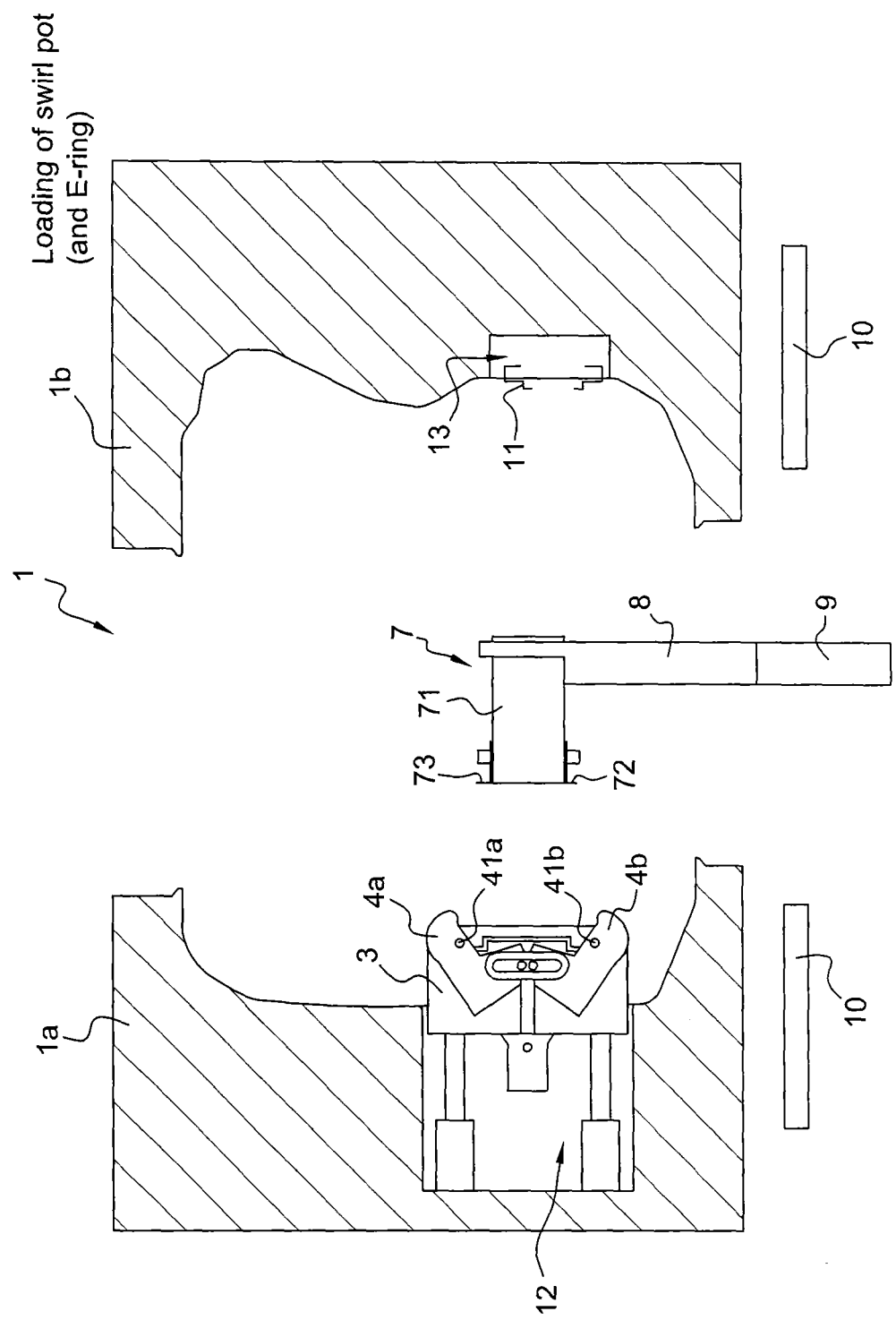
FIG. 2 is a cross-section view showing an embodiment including a swirl pot loaded onto a holding rod.

As illustrated in FIG. 2, the swirl pot (7) is loaded onto the holding rod (8). The swirl pot (7) comprises a body (71) and two attaching portions (72, 73) which project radially outward from the body (71). The E-ring (11) is loaded in the recess (13).

Figure 3:
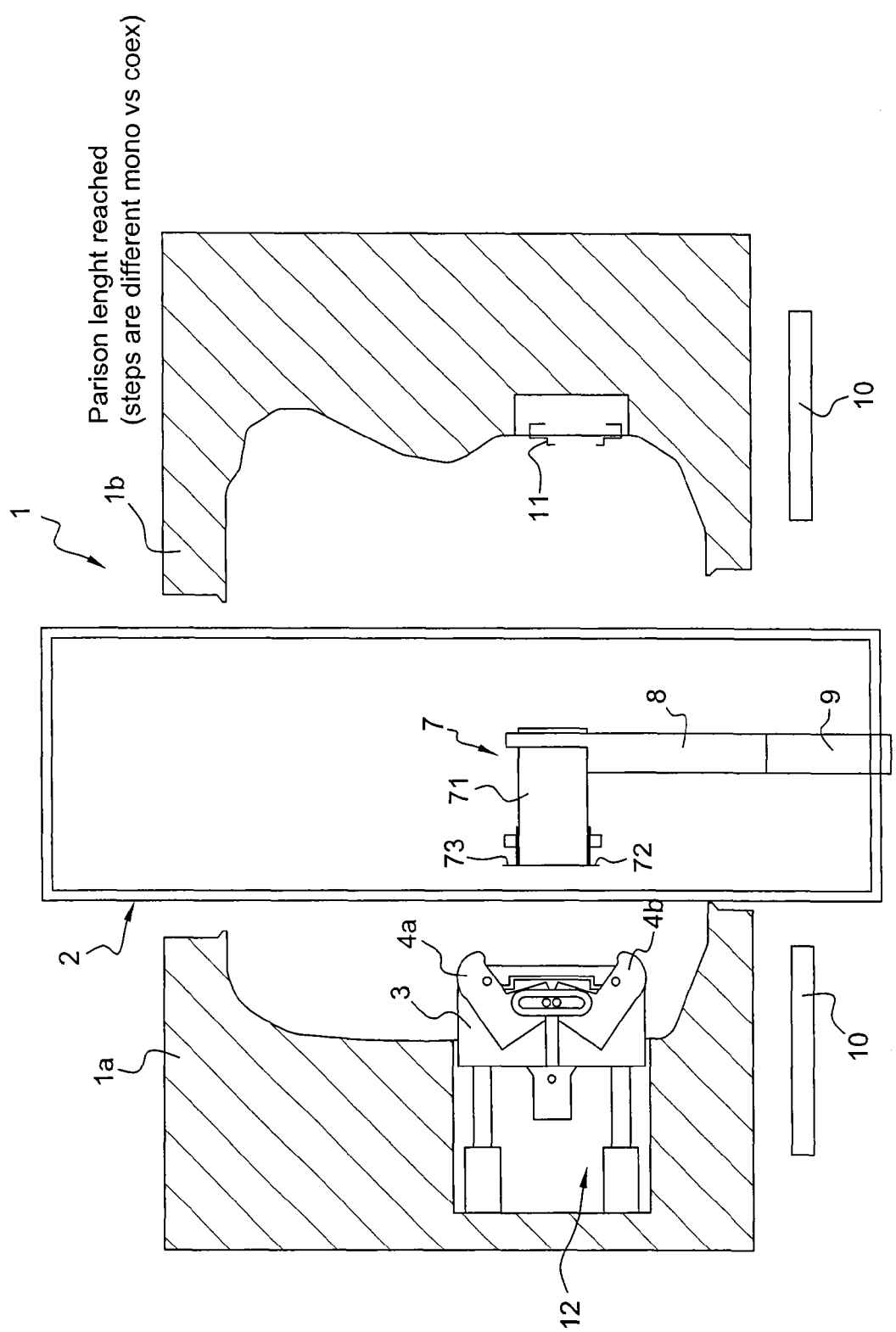
FIG. 3 is a cross-section view showing an embodiment including a parison extruded and introduced in a mould such that it surrounds a swirl pot.

As illustrated in FIG. 3, the parison (2) is extruded and introduced in the mould such that it surrounds the swirl pot (7). The extruded parison (2) is in a molten state. During the extrusion operation, there is no contact between the swirl pot (7) and the parison (2).

Figure 4:
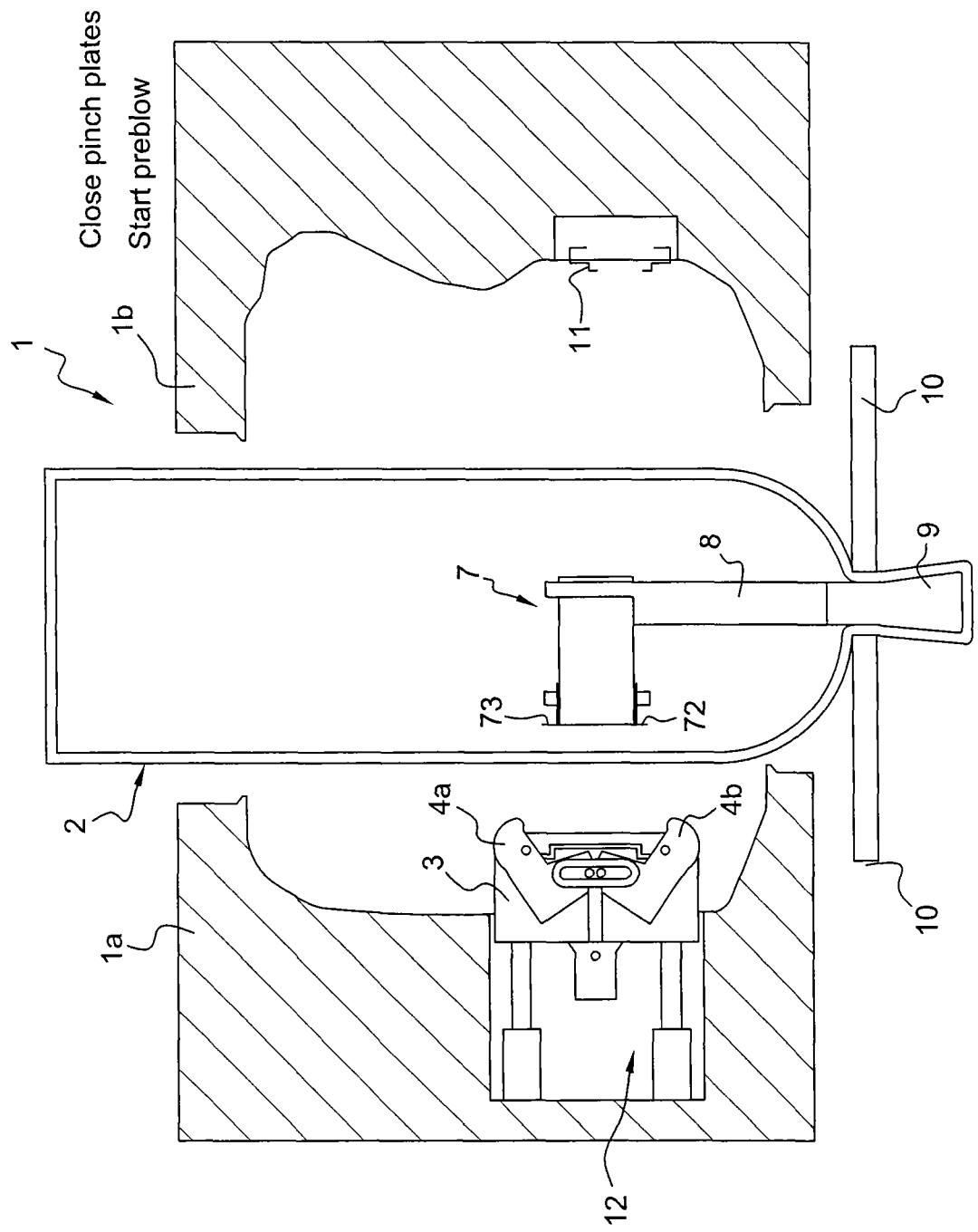
FIG. 4 is a cross-section view showing an embodiment including pinch plates in a closed position.

In FIG. 4, the pinch plates (10) can be seen in a closed position which is such that the lower end of the parison is clamped to the inner block (9) s so as to carry out a pre-blowing (i.e. pre-blow moulding) in a leaktight manner using, for example, the extrusion head (not represented), to which the parison is still attached.

Figure 5:
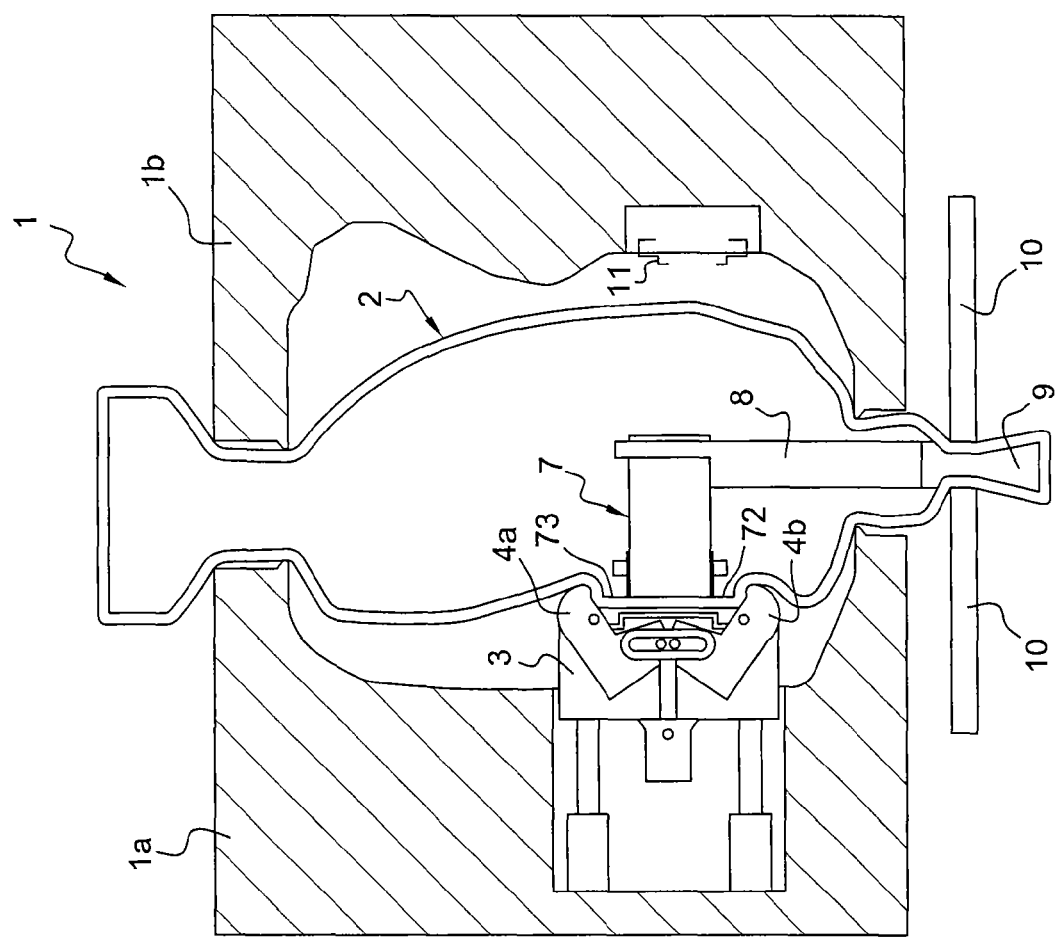
FIG. 5 is a cross-section view showing an embodiment including a mould in an intermediate closing position.

In FIG. 5, the mould (1) can be seen in an intermediate closing position which is such that the mounting structure (3) has locally pushed the molten parison to bring it into contact locally with the swirl pot (7). The molten parison is brought into contact with the attaching portions (72, 73). The attaching portions (72, 73) are made in the same plastic as that forming the parison. Accordingly, the attaching portions (72, 73) are welded with the locally pushed parison. As illustrated in FIG. 5, the mould cavities (1a, 1b) have been moved one towards the other, but remains separated (i.e. not in contact). The pre-blowing continues. As illustrated in FIG. 5, the molten parison is not contacting with the mould cavities.

Figure 6:
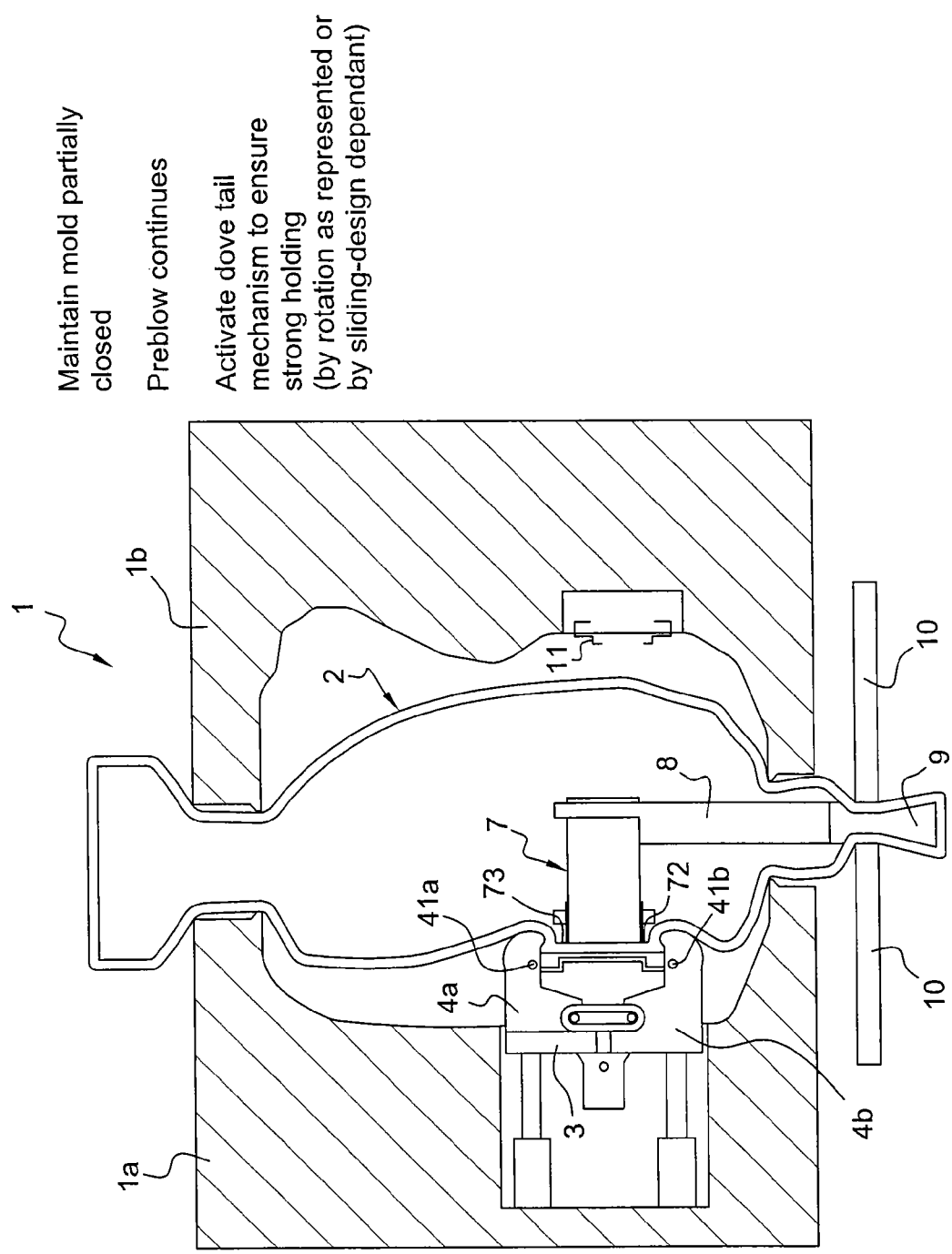
FIG. 6 is a cross-section view showing an embodiment including movable inserts moved in a folding operation.

In FIG. 6, it can be seen how the movable inserts (4a, 4b) fold some of the molten parison on the attaching portions (72, 73). As illustrated, the movable inserts (4a, 4b) have been moved in rotation about the axis (41a, 41b). The folding operation is such that the attaching portions (72, 73) are overmoulded by some of the molten parison so as to ensure strong attachment of the swirl pot (7) to the interior surface of the parison. The movable inserts (4a, 4b) are sized and shaped such that it is formed an attachment of the dovetail shape. During the folding operation, the mould (1) is maintained at the intermediate closing position and the pre-blowing continues. It is to note that the folding operation is easy and efficient since the molten parison is not contacting with the mould cavities and thus remains in a melt state (i.e. no cooling and/or no crystallization of the parison due to contact with the mould cavities).

Figure 7:
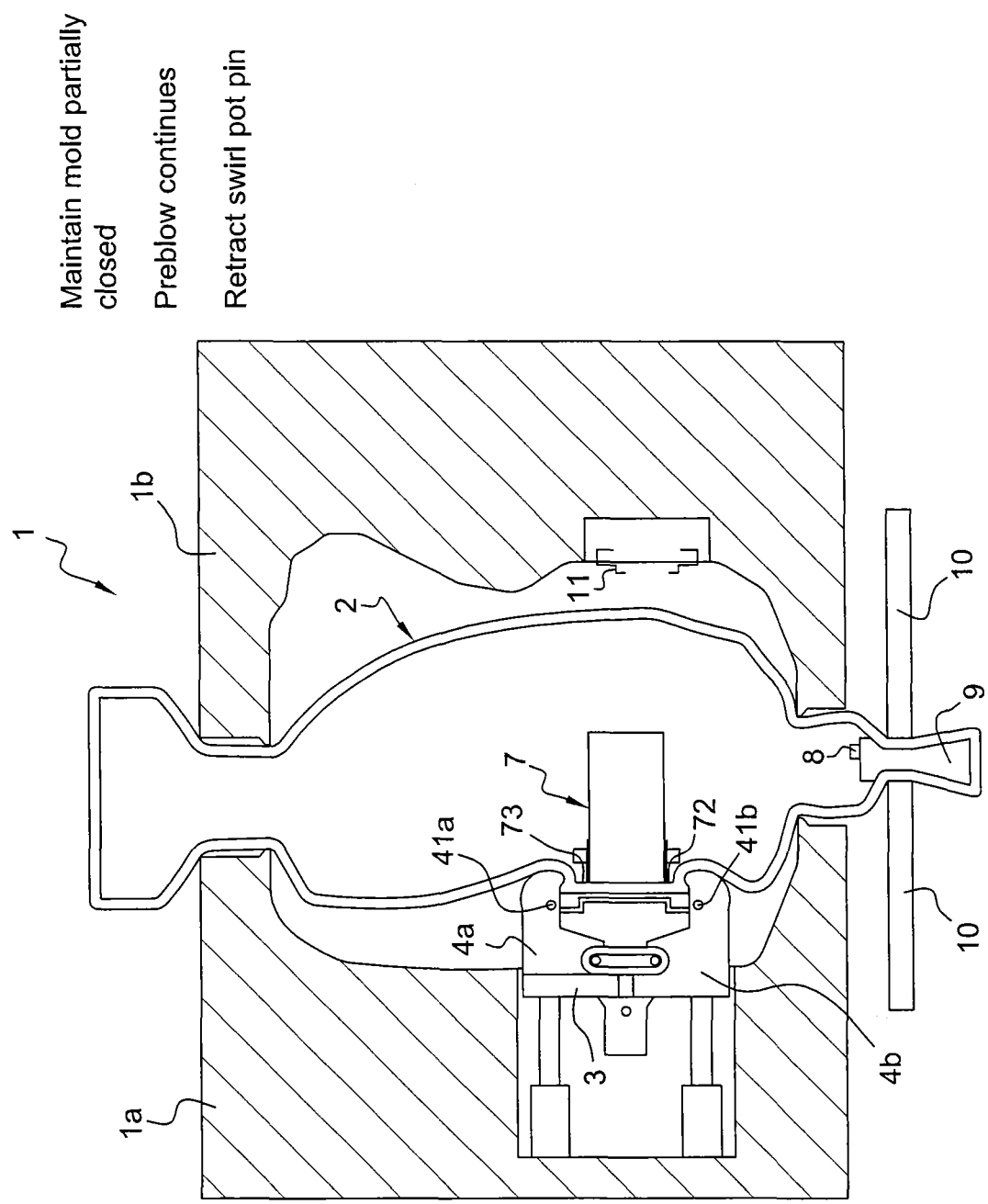
FIG. 7 is a cross-section view showing an embodiment including a swirl pot secured to an interior surface of a parison and a holding rod in a withdrawal operation.

As illustrated in FIG. 7, once the swirl pot (7) is secured to the interior surface of the parison, the holding rod (8) is withdrawn (i.e. moves out of the mould). During this withdrawal operation, the mould (1) is maintained at the intermediate closing position and the pre-blowing continues.

Figure 8:
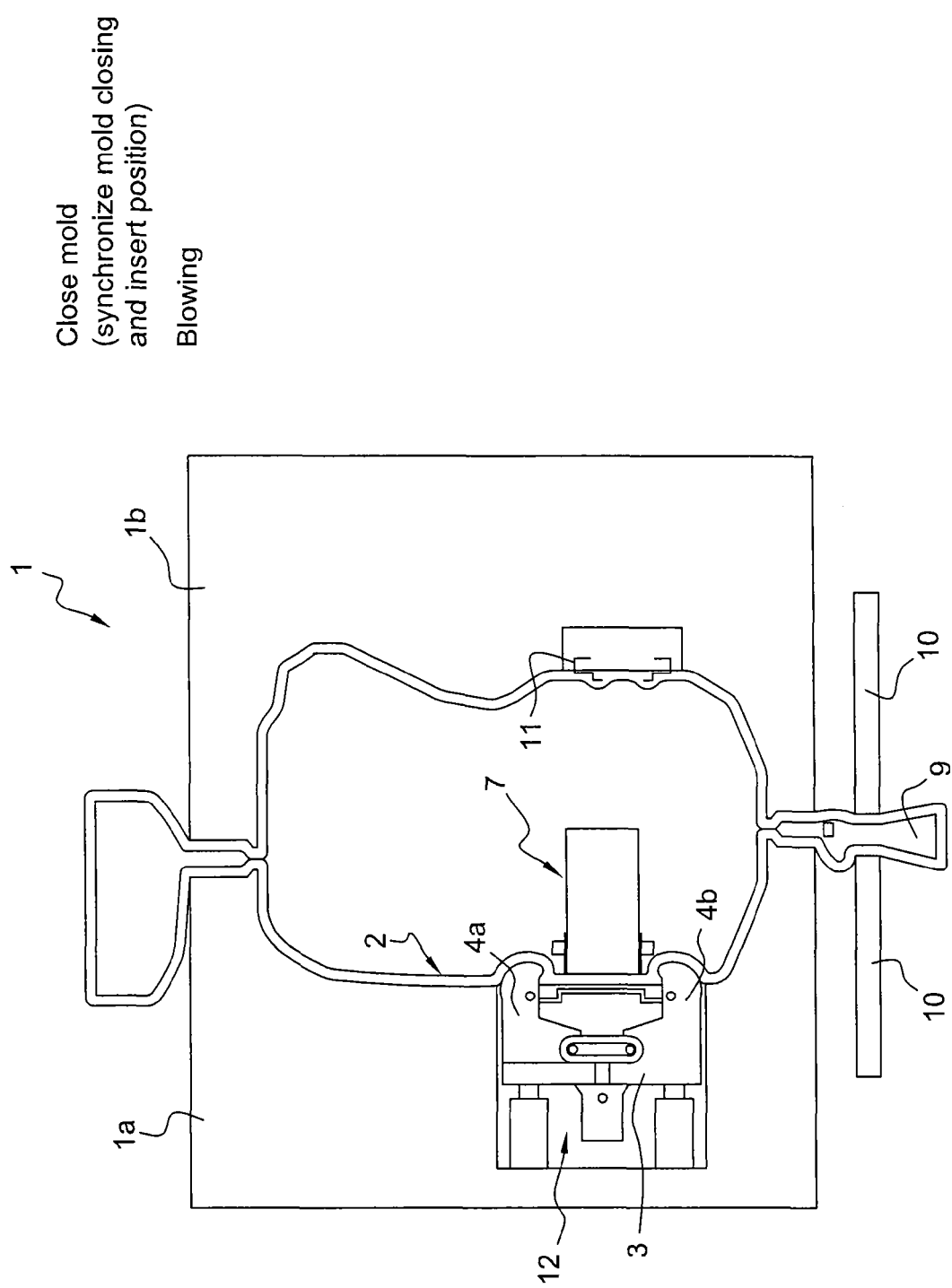
FIG. 8 is a cross-section view showing an embodiment including a mould in a final closing position.

Once the holding rod (8) is withdrawn, it is possible to close the mould (1) for the final blow-moulding of the tank. In FIG. 8, the mould (1) can be seen in a final closing position which is such that the mould cavities are placed side by side over their perimeter. During the mould closing operation, the mounting structure (3) retracts inside the recess (12) (although it is immobile in absolute terms and keep the welding points under pressure). The movement of the mounting structure (3) is synchronised to the closing movement of the mould (1) using a synchronization system.

In a particular embodiment, the synchronization system can be based on the use of a stopper located on a stretching table. A stretching table is conventionally used to stretch the parison, changing its shape from round to oval or flat shape by use of one or more pin(s). Advantageously, a long beam is installed vertically, parallel to the mold. This beam is stationary and acts as a stopper. In the mold, the mounting structure (3) connects to the beam by means of a lever system. This lever system is designed to have a 1:1 ratio from: a) the rotation point to the mounting structure (3) axis and b) from the mounting structure axis to the push pin. This push pin contacts the beam when the accessory contacts the parison. When the mold closes, the pin keeps contacting the beam and retracts accordingly the mounting structure.

Figure 11:
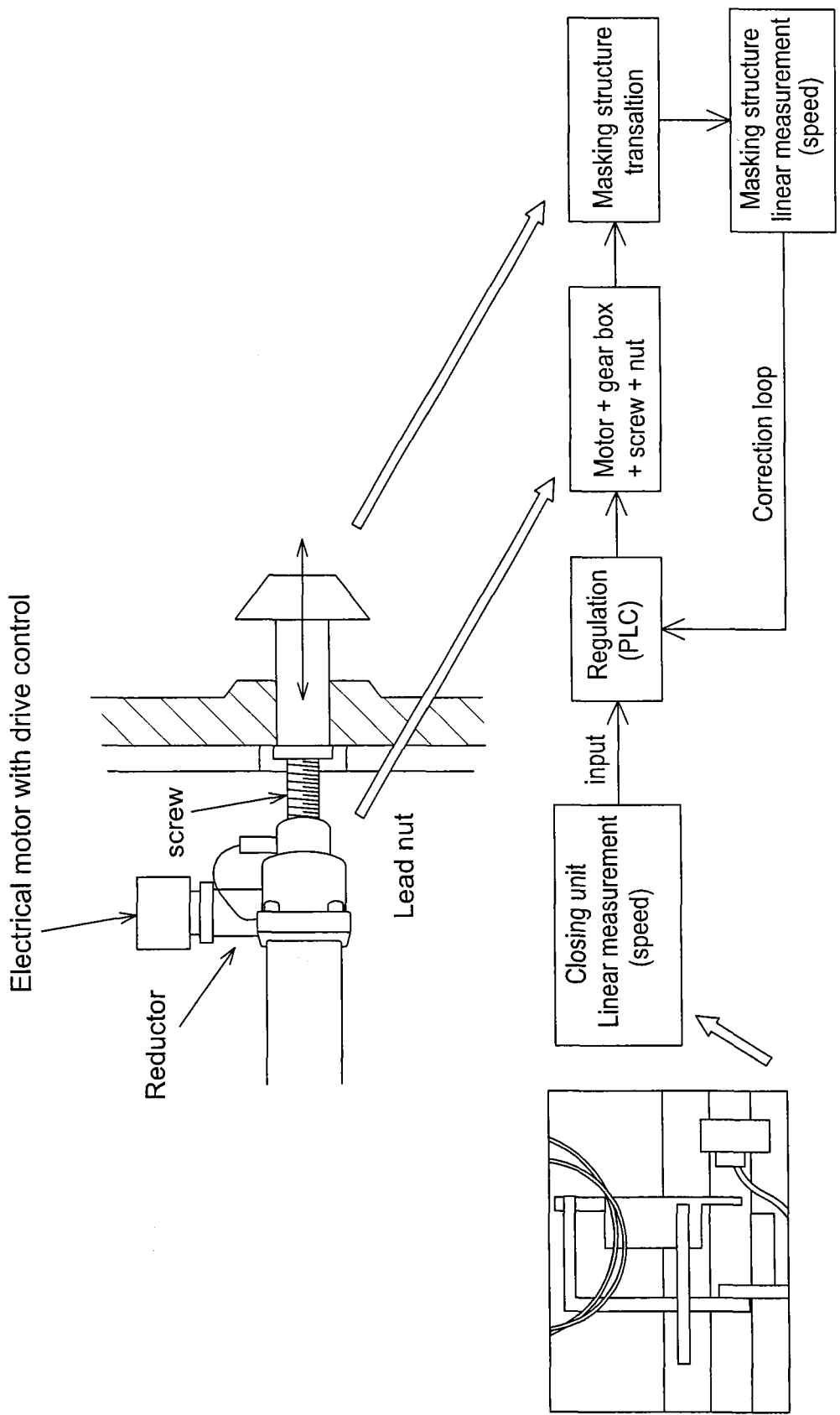
FIG. 11 is a schematic view showing an embodiment including a synchronization system.

In another particular embodiment, the synchronization system can be based on the use of a closed loop electrical drive (illustrated in FIG. 11). Advantageously, the linear transducer from the mold closing unit (or any add-on transducer that is able to read the closing stroke and time (i.e. speed)) is sending a digital signal to an electronic unit, converting and distributing the signal to an electrical drive system. Accordingly, the movement of the mold is exactly reproduced (i.e. transmitted) to the mounting structure by means of a motor/reductor/screw system.

In a particular embodiment, the final blow-moulding operation can be carried out using blow-moulding needles (not represented).

Figure 9:
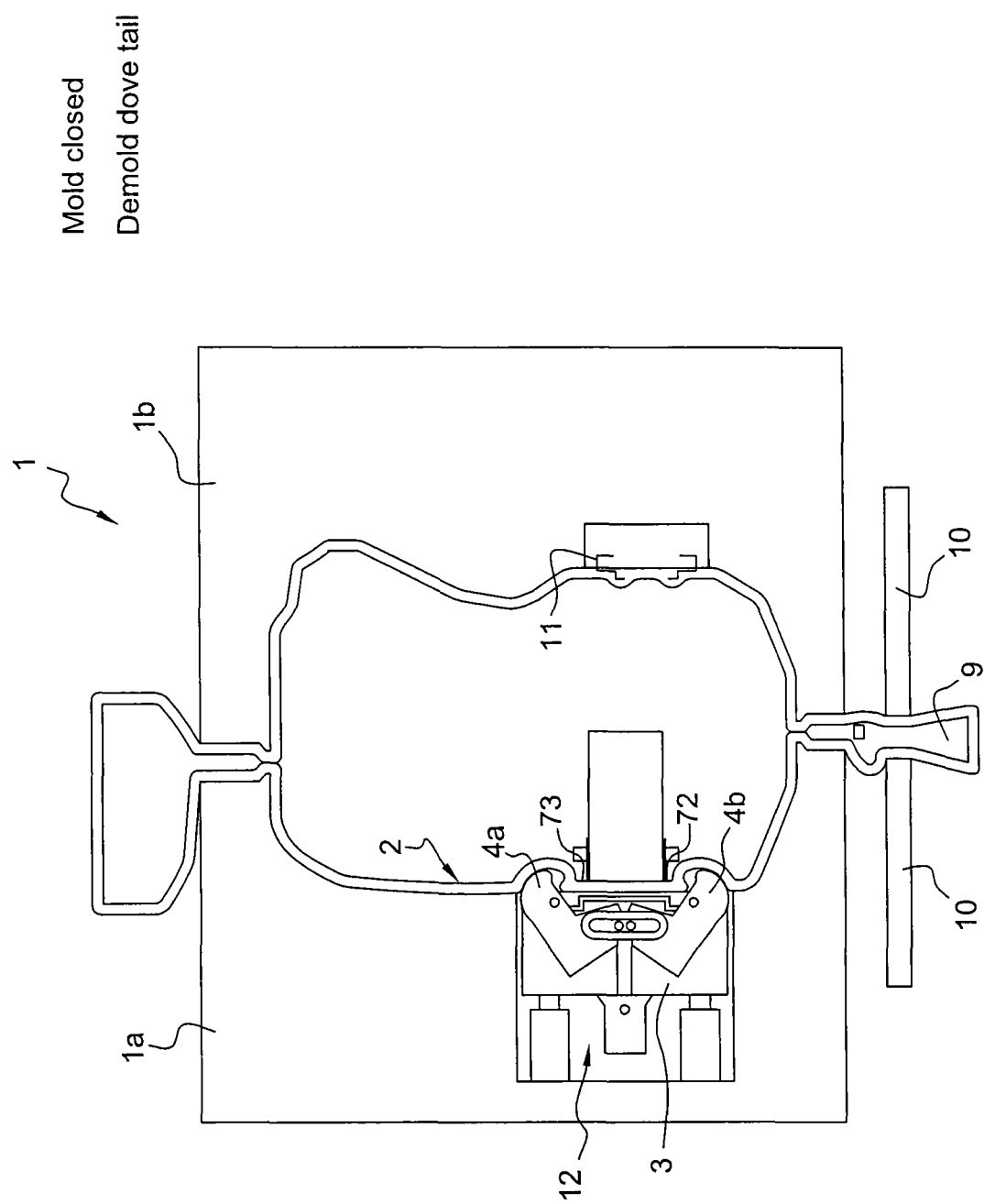
FIG. 9 is a cross-section view showing an embodiment including a movable inserts disengaged.

As illustrated in FIG. 9, when the tank has been cooled down, the movable inserts (4a, 4b) disengage the portion of folded parison.

Figure 10:
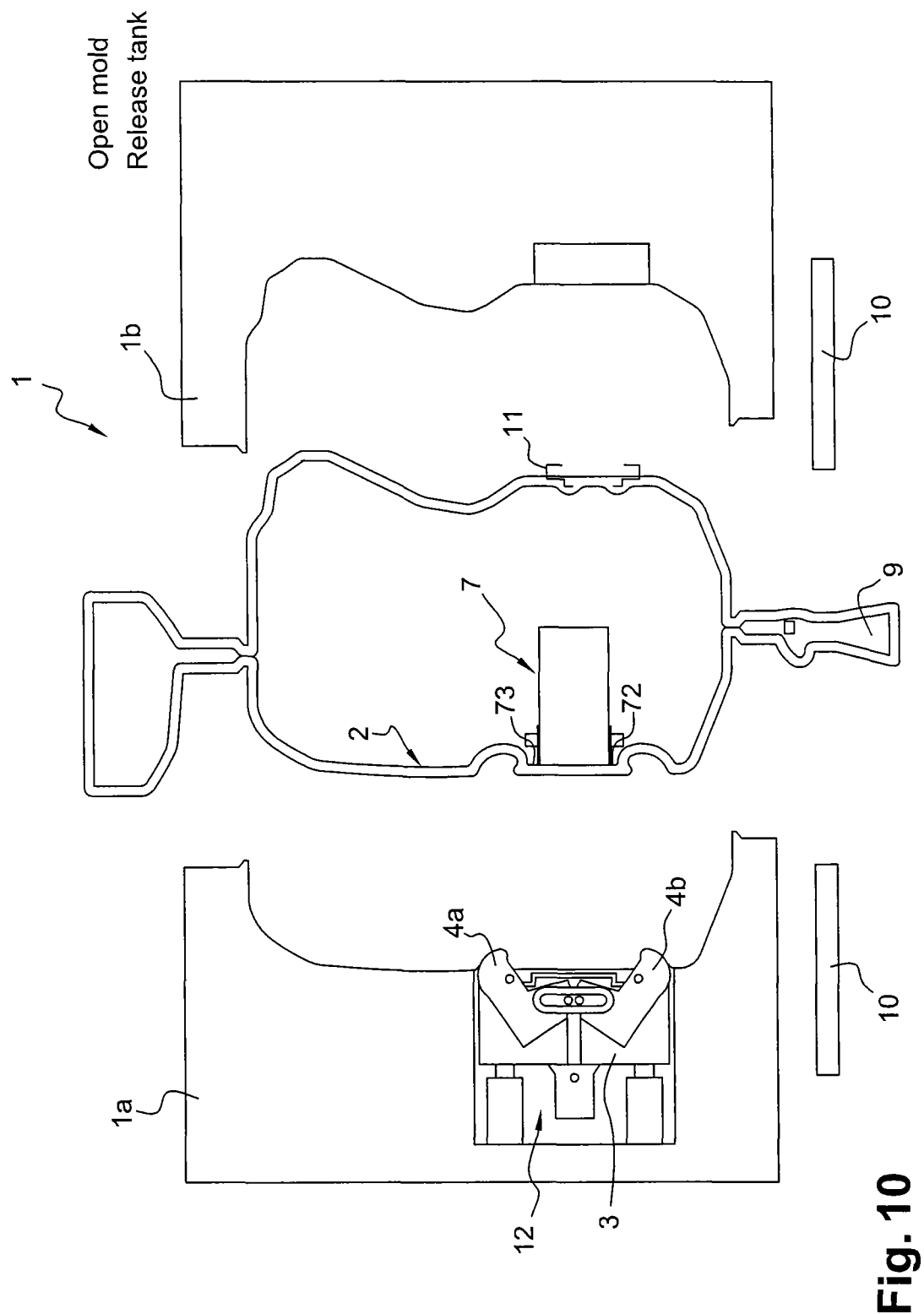
FIG. 10 is a cross-section view showing an embodiment including a mould opened.

Finally, and as it can be seen in FIG. 10, the mould (1) is opened and the tank may be demoulded. The swirl pot (7) is securely and permanently fastened to the interior surface of the tank by a combination of welding and dove-tail fit.

Figure 12:
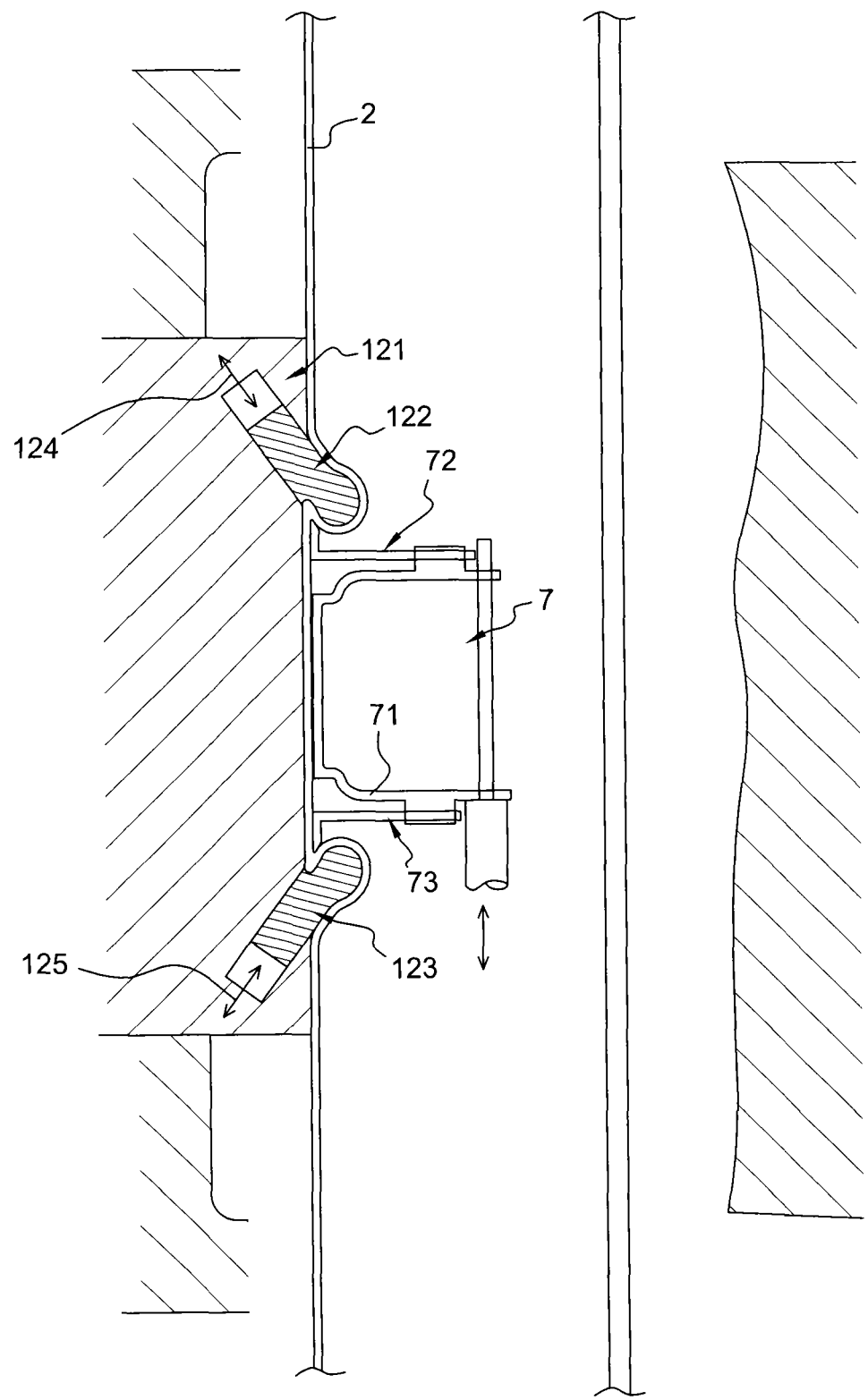
FIG. 12 is a schematic view of an embodiment including a mounting structure.

FIG. 12 illustrates schematically a mounting structure (121) equipped with two movable inserts (122, 123) according to another particular embodiment of the present invention. The movable inserts (122, 123) can move forward and backward in translation as represented by the arrows (124, 125). The movable inserts (122, 123) have a hook-shaped cross section.

The invention claimed is:

1. A process for fastening an accessory to an interior of a blow-molded tank, said tank having a plastic wall produced from a parison, the accessory comprising a body having at least one attaching portion projecting radially from said body, the process comprising:
   introducing the accessory and the parison in a molten state into a mould so that the accessory is surrounded by the parison, said mould comprising mould cavities, at least one of the mould cavities being equipped with at least one movable insert configured to fold locally some of the molten parison on said attaching portion;
   moving the mould cavities to an intermediate closing position at which the mould cavities are not pressed against one another and at which the parison contacts with said attaching portion;
   moving forward the insert and folding locally some of the molten parison on said attaching portion such that said attaching portion is partially or totally surrounded by molten parison;
   closing the mould by moving the mould cavities to a final closing position at which the mould cavities are pressed against one another, and inflating the parison to form said blow-molded tank;
   moving backwards the insert; and
   opening the mould.

2. The process according to claim 1, wherein the accessory comprises a pair of diametrically opposed attaching portions, and wherein said cavity is equipped with two movable inserts, each being configured to fold locally some of the molten parison on one attaching portion of said pair.

3. The process according to claim 1, wherein each insert has a curved contact surface.

4. The process according to claim 1, wherein said cavity is equipped with a movable mounting structure on which the insert is movably mounted.

5. The process according to claim 4, wherein during the moving of the mould cavities, the mounting structure presses the parison against said attaching portion, and wherein during the moving of the insert, the mould cavities are maintained in said intermediate closing position.

6. The process according to claim 4, wherein a movement of the mounting structure is synchronised to a closing movement of the mould such that during the moving of the mould cavities and the moving of the insert, the mounting structure projects outwardly from said cavity and during the closing of the mould, the mounting structure does not move so that it is retracted inside said cavity.

7. The process according to claim 1, wherein before the moving of the mould cavities, a pressurized gas is introduced inside the parison to carry out a pre-blow moulding of said parison.

8. The process according to claim 1, wherein the accessory is held in the parison by a support which is withdrawn after the moving forward of the insert and before the moving backwards of the insert.

9. The process according to claim 1, wherein said blow-molded tank is a fuel tank.

10. The process according to claim 9, wherein the accessory is a swirl pot.

11. A mould for use in a process for fastening an accessory to the interior of a blow-molded tank according to claim 1, said mould comprising cavities, at least one cavity being equipped with at least one movable insert configured to move forward and fold locally some of the parison in a molten state on the attaching portion of the accessory such that said attaching portion is partially or totally surrounded by molten parison.

12. A process for fastening an accessory to an interior of a blow-molded tank, said tank having a plastic wall produced from a parison, the accessory comprising a body having at least one attaching portion projecting radially from said body, the process comprising:
   introducing the accessory and the parison in a molten state into a mould so that the accessory is surrounded by the parison, said mould comprising mould cavities, at least one of the mould cavities being equipped with at least one movable insert configured to pivot;
   moving the mould cavities to an intermediate closing position at which the mould cavities are not pressed against one another and at which the parison contacts with said attaching portion;
   moving forward the insert and pivoting the insert to fold some of the molten parison locally such that said attaching portion is partially or totally surrounded by molten parison;
   closing the mould by moving the mould cavities to a final closing position at which the mould cavities are pressed against one another, and inflating the parison to form said blow-molded tank;
   moving backwards the insert; and
   opening the mould.

* * * * *